March 10, 1959
J. J. MOORE ET AL
2,877,360
TRIGGERED TRANSISTOR OSCILLATOR CIRCUIT TO
REPLACE A SENSITIVE D. C. RELAY
Filed June 6, 1956

INVENTORS
J. J. MOORE
J. J. DAROLD

BY

ATTORNEYS

United States Patent Office 2,877,360
Patented Mar. 10, 1959

2,877,360

TRIGGERED TRANSISTOR OSCILLATOR CIRCUIT TO REPLACE A SENSITIVE D. C. RELAY

Jimmy J. Moore, Adelphi, and James J. Da Rold, Hyattsville, Md., assignors to the United States of America as represented by the Secretary of the Navy Application June 6, 1956, Serial No. 589,829

3 Claims. (Cl. 307—88.5)

(Granted under Title 35, U. S. Code (1952), sec. 266)

The invention described herein may be manufactured and used by or for the Government of the United States of America for governmental purposes without the payment of any royalties thereon or therefor.

This invention relates generally to electronic relay devices, and more particularly to electronic relay devices utilizing semi conductive elements, such as transistors, therein.

Heretofore devised and utilized D. C. relays for sensitive applications, such as sensitrol relays, have not been found to perform entirely satisfactorily in many present day ordnance applications by reason of their inability to withstand the severe shock and excessive vibration requirements of these present day ordnance applications.

Accordingly, one object of the present invention is to provide a new and improved sensitive relay device.

Another object of the present invention is to provide a new and improved semi conductor relay device.

Still another object of the present invention is to provide a new and improved shock and vibration resistant electronic relay apparatus.

A further object of the present invention is to provide a new and improved triggered semi conductor relay device.

A still further object of the present invention is to provide a simple, small, and compact electronic relay device.

Other objects and many of the attendant advantages of this invention will be readily appreciated as the same becomes better understood by reference to the following detailed description when considered in connection with the accompanying drawings wherein.

Figure 1:
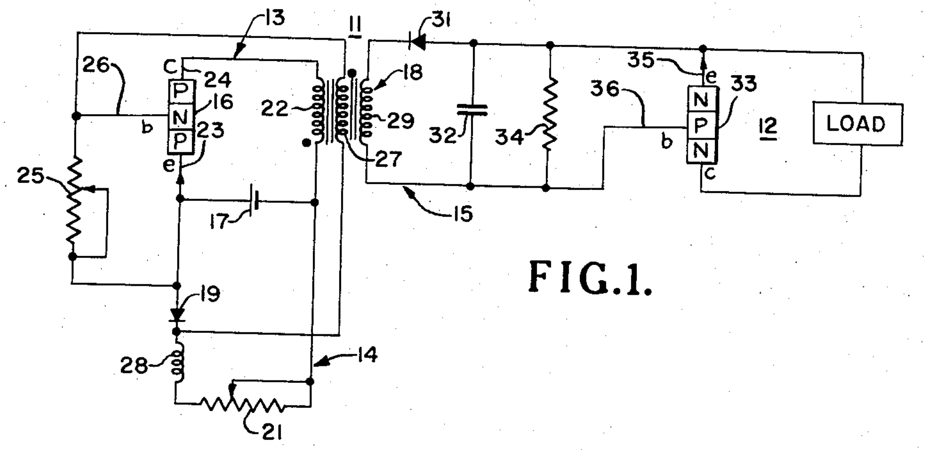
Fig. 1 is a schematic diagram showing a preferred embodiment of the present invention.

Referring now to the accompanying drawing wherein like numerals indicate like parts throughout the several views, and more particularly to Fig. 1 whereon is shown the control circuit, generally indicated by the numeral 11, and the controlled, or load, circuit, generally indicated by the numeral 12, of the inventive semi-conductor relay device. The relay control circuit 11 consists of a feedback type transistor oscillator circuit 13 which can be triggered into oscillation by the application of a suitable unidirectional control current from a control circuit 14, and a rectifier and filter circuit 15 which converts the oscillatory energy generated by oscillator 13 into a suitable unidirectional energy. The oscillator circuit includes a semiconductor device 16, preferably a junction type transistor, a suitable source of unidirectional potential 17 such as a battery, a multiple winding transformer 18, a semiconductor diode 19, and a variable resistance element 21. The battery 17 and primary winding 22 of transformer 18 are series connected between the emitter and collector electrodes, respectively designated by reference numerals 23 and 24 of transistor 16. A variable resistor 25 interconnecting the emitter 23 and base electrode 26 is utilized to provide a suitable emitter biasing potential thereby controlling the operating characteristics of load circuit 12. An external feedback path consisting of diode 19 and winding 27 of transformer 18 is series connected between the emitter and base electrodes of transistor 16 for feeding back the required amount of generated energy to maintain oscillation of the oscillator circuit 13.

As indicated in Fig. 1, the polarities of windings 22 and 27 are such that the alternating voltages induced in feedback winding 27 are in phase opposition to the alternating voltage in primary winding 22 of transformer 18. The amount of energy feedback in the oscillator circuit is controlled by variation of the A. C. resistance of semi conductor diode 19.

The principle is well known in the semi conductor art that the A. C. resistance, or impedance, of a semi conductor diode is inversely proportioned to the magnitude of the D. C. current flowing through the diode. Accordingly the A. C. resistance of the diode 19 is varied by the D. C. current flow in control circuit 14 which in turn is controlled by the magnitude of battery 17 and of resistance introduced into the control circuit 14 by variable resistor 21. A choke coil 28 is included in the control circuit for blocking out the A. C. energy generated by the oscillator 13.

The generated A. C. voltage of oscillator 13 is coupled to the rectifier circuit 15 through a secondary winding 29 of transformer 18. A unidirectional element, such as a semiconductor diode 31, and a smoothing capacitor 32, of rectifier circuit 15, converts the generated voltage into a suitable D. C. signal for application to junction transistor 33 of the relay load, or utilization, circuit 12.

In the absence of oscillation of oscillator 13, transistor 33 functions as the open contacts in the load circuit of a conventional relay. A resistor 34 is connected across the emitter and base electrodes, 35 and 36 respectively, of transistor 33 to insure this "open contact" condition of the controlled, or load, circuit 12.

Upon the application of a suitable D. C. control signal to diode 19 by manually decreasing the effective resistance of resistor 21, oscillator 13 is triggered into operation. The generated signal is converted into a suitable D. C. signal by filter circuit 15 whereupon it is impressed upon the nonconducting transistor 33 for rendering the transistor conductive and the load circuit 12 closed. Inasmuch as the load circuit 12 only remains closed until the A. C. impedance of diode 19 is returned to its initial value by decreasing the D. C. current in the control circuit 14 by manually increasing the effective resistance of resistor 21, whereupon oscillations are quenched, the electronic relay of Fig. 1 is equivalent to a "nonlatching" type relay. It is to be noted that battery 17 furnishes operating bias for both transistors 16 and 33 as well as the D. C. control current for control circuit 14.

Figure 2:
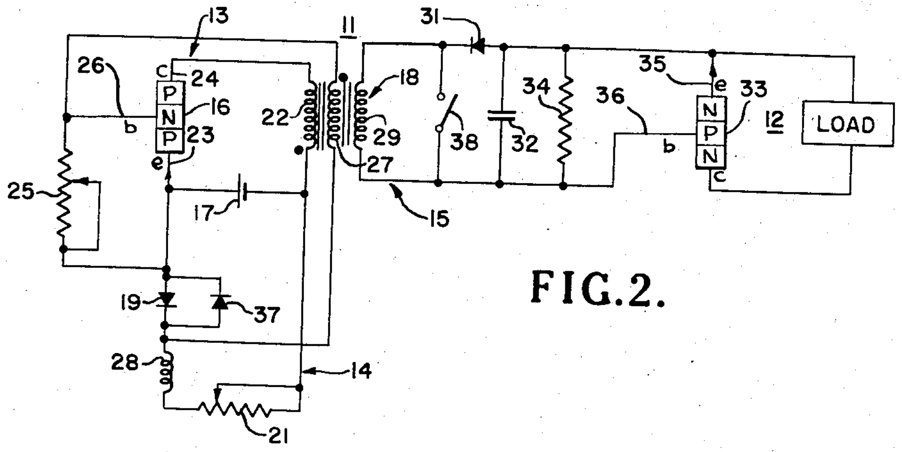
Fig. 2 is a schematic diagram showing another embodiment of the present invention; and, Fig. 3 is a schematic diagram showing a further embodiment of the present invention.

In accordance with another aspect of the present invention, Fig. 2 illustrates a "latch on" or "latching" type electronic relay obtainable from the basic electronic relay device shown in Fig. 1. As shown in Fig. 2, the reverse addition of a semi-conductor diode 37 across diode 19 enables the oscillator circuit 13 to continue in oscillation despite the removal or decrease of the D. C. control circuit 14. The "back to back" diode arrangement insures that once oscillations commence in oscillator circuit 13, the circuit will continue to furnish its own D. C. current to maintain oscillation. Unlike the "nonlatching" electronic relay, in order to reset the "latching" electronic relay to its nonoscillating condition, a shorting switch 38 is placed across the secondary winding 29 of transformer 18 which upon being closed loads down the oscillator circuit 13 thereby terminating oscillation thereof.

Figure 3:
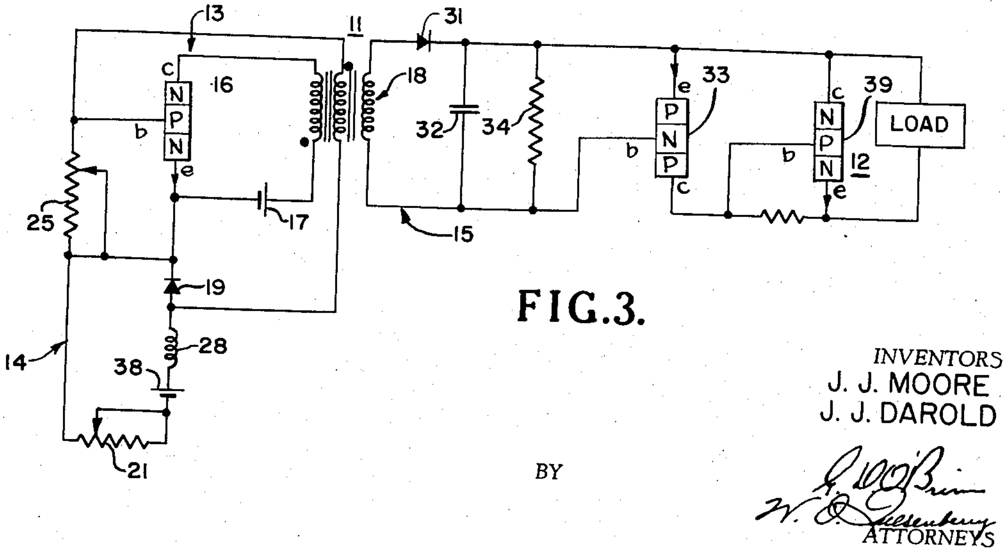

In Fig. 3 there is shown an electronic relay arrangement utilized for heavy duty applications. In this arrangement an additional battery 38 is included in the control circuit 14 for furnishing the D. C. control current to diode 19, and junction transistor 39 is added to the load circuit 12 for passing the required load current. Additionally the size of battery 17 may be increased to furnish the additionally required power.

It is to be noted that although the electronic relay arrangements of Figs. 1 and 2 have been illustrated and described as utilizing a *p—n—p* type junction transistor in the oscillator circuit 13 and a *n—p—n* type junction transistor in the load circuit 12, as shown in Fig. 3, the relay will operate satisfactorily if transistor 16 is a *n—p—n* type and transistor 33 is a *p—n—p* type, provided the polarities of D. C. sources 17 and 38 and semiconductor diodes 19 and 31 are revised accordingly.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. An electronic relay of the latching type comprising a junction type transistor having emitter, base, and collector electrodes, a source of unidirectional potential, a transformer having a plurality of associated windings, a pair of back-to-back connected unidirectional current conductive means, circuit means for serially connecting a first transformer winding and said source between said emitter and collector electrodes, a variable resistor connected between said base and said emitter for controlling the biasing potential of said transistor, a feedback circuit serially connecting said unidirectional conductive means and a second transformer winding between said emitter and base electrodes, circuit means including a variable resistance for selectively varying the magnitude of the alternating current impedance of said unidirectional conductive means thereby rendering said transistor oscillatory, a rectifying and filtering circuit coupled across a third transformer winding, a normally interrupted shorting circuit connected across said third winding for rendering said transistor non-oscillatory upon being rendered continuous, said last recited circuit means and said shorting circuit operating to render said transistor alternatively oscillatory and non-oscillatory, and a utilization circuit coupled to said rectifying and filtering circuit, said utilization circuit including a semiconductor element adapted to being rendered alternatively conductive and non-conductive correlative to the alternatively oscillatory and non-oscillatory condition of said transistor thereby to render said utilization circuit alternatively continuous and interrupted.

2. An electronic relay apparatus of the nonlatching type comprising a feedback type transistor oscillator circuit for generating an alternating current potential, said oscillator circuit including a junction type transistor having emitter, base, and collector electrodes, a source of unidirectional potential, a transformer having a plurality of associated windings, a semiconductor diode, circuit means for serially connecting a first transformer winding and said source between said emitter and collector electrodes, variable resistor connected between said base and emitter electrodes for controlling the biasing potential on said transistor, a feedback circuit serially connecting said diode and a second transformer winding between said emitter and base electrodes, circuit means including a variable resistor for selectively varying the magnitude of the alternating current impedance of said diode thereby to alternatively render said oscillator circuit oscillatory and non-oscillatory, a rectifier and filter coupled across a third transformer winding circuit to said oscillator circuit for changing said generated alternating current potential to direct current potential, and a load circuit connected to said rectifier and filter circuit, said load circuit including an initially nonconducting transistor device adapted to being rendered alternatively conductive and non-conductive correlative to said oscillator circuit being rendered alternatively oscillatory and non-oscillatory thereby to render said load circuit alternatively continuous and interrupted.

3. An electronic relay comprising a junction type transistor, a unidirectional potential energy source, a transformer having a plurality of associated windings, unidirectional current conductive means, first circuit means for serially connecting said source and a first one of said windings between the emitter and collector electrodes of said transistor, a variable biasing impedance connected between the base and emitter electrodes of said transistor, second circuit means for serially connecting said unidirectional conductive means and a second one of said windings between the emitter and base electrodes of said transistor, third circuit means including a variable impedance for selectively regulating the magnitude of the alternating current impedance of said unidirectional current conductive means thereby to alternatively render said transistor oscillatory and non-oscillatory, a rectifying and filtering circuit coupled across a third one of said windings, and a utilization circuit coupled to said rectifying and filtering circuit, said utilization circuit including a semiconductor element adapted to being rendered alternatively conductive and non-conductive correlative to said transistor being rendered alternatively oscillatory and non-oscillatory, thereby to alternatively render said utilization circuit continuous and interrupted.

References Cited in the file of this patent

UNITED STATES PATENTS

| | | |
|---|---|---|
| 2,751,545 | Chase | June 19, 1956 |
| 2,751,550 | Chase | June 19, 1956 |
| 2,757,243 | Thomas | July 31, 1956 |
| 2,780,767 | Janssen | Feb. 5, 1957 |